United States Patent
Van Der Veen et al.

(10) Patent No.: US 8,091,828 B2
(45) Date of Patent: Jan. 10, 2012

(54) STRUCTURAL ELEMENT AND METHOD OF MANUFACTURE

(75) Inventors: Sjoerd Van Der Veen, Tournefeuille (FR); Jean-Christophe Ehrstrom, Echirolles (FR); Henri Gerard, Claix (FR); Francois Lemaitre, Grenoble (FR)

(73) Assignee: Airbus Operations Limited, Bristol (GB)

( * ) Notice: Subject to any disclaimer, the term of this patent is extended or adjusted under 35 U.S.C. 154(b) by 915 days.

(21) Appl. No.: 12/093,151

(22) PCT Filed: Dec. 15, 2006

(86) PCT No.: PCT/GB2006/004701
§ 371 (c)(1),
(2), (4) Date: May 9, 2008

(87) PCT Pub. No.: WO2007/068943
PCT Pub. Date: Jun. 21, 2007

(65) Prior Publication Data
US 2008/0265094 A1 Oct. 30, 2008

(30) Foreign Application Priority Data
Dec. 16, 2005 (FR) .................................. 05 12808

(51) Int. Cl.
*B64C 1/06* (2006.01)
*B64C 3/18* (2006.01)
(52) U.S. Cl. ................. 244/117 R; 244/123.1; 244/132; 29/897.2
(58) Field of Classification Search ............... 244/117 R, 244/119, 123.1, 123.3, 123.8, 131, 132; 29/897.2
See application file for complete search history.

(56) References Cited

U.S. PATENT DOCUMENTS

| | | | |
|---|---|---|---|
| 4,356,616 A * | 11/1982 | Scott | 29/897.2 |
| 6,051,325 A | 4/2000 | Talwar et al. | |
| 6,328,261 B1 | 12/2001 | Wollaston et al. | |
| 6,443,392 B2 * | 9/2002 | Weber et al. | 244/117 R |

FOREIGN PATENT DOCUMENTS

| | | |
|---|---|---|
| EP | 1 547 720 A1 | 6/2005 |
| WO | 98/58759 A1 | 12/1998 |

OTHER PUBLICATIONS

ISR and Written Opinion for PCT/GB2006/004701 dated Mar. 28, 2007.

* cited by examiner

*Primary Examiner* — Tien Dinh
*Assistant Examiner* — Richard R Green
(74) *Attorney, Agent, or Firm* — Lowe, Hauptman, Ham & Berner, LLP

(57) ABSTRACT

In a method for manufacturing a structural element intended for aeronautical construction, at least a first and second metal block are made available, the limit of elasticity under compression of the first metal block being greater than that of the second metal block. The first metal block is machined in such a manner as to obtain a first machined monolithic part which has a first web portion and at least one stringer element whose height is such that a stringer portion extends beyond the first web portion. There is prepared, by shaping the second metal block, at least one second part having at least a second web portion capable of co-operating with the first web portion to form the web. The first monolithic part and the second part are assembled by placing the first and second web portions end-to-end over their entire common length.

30 Claims, 10 Drawing Sheets

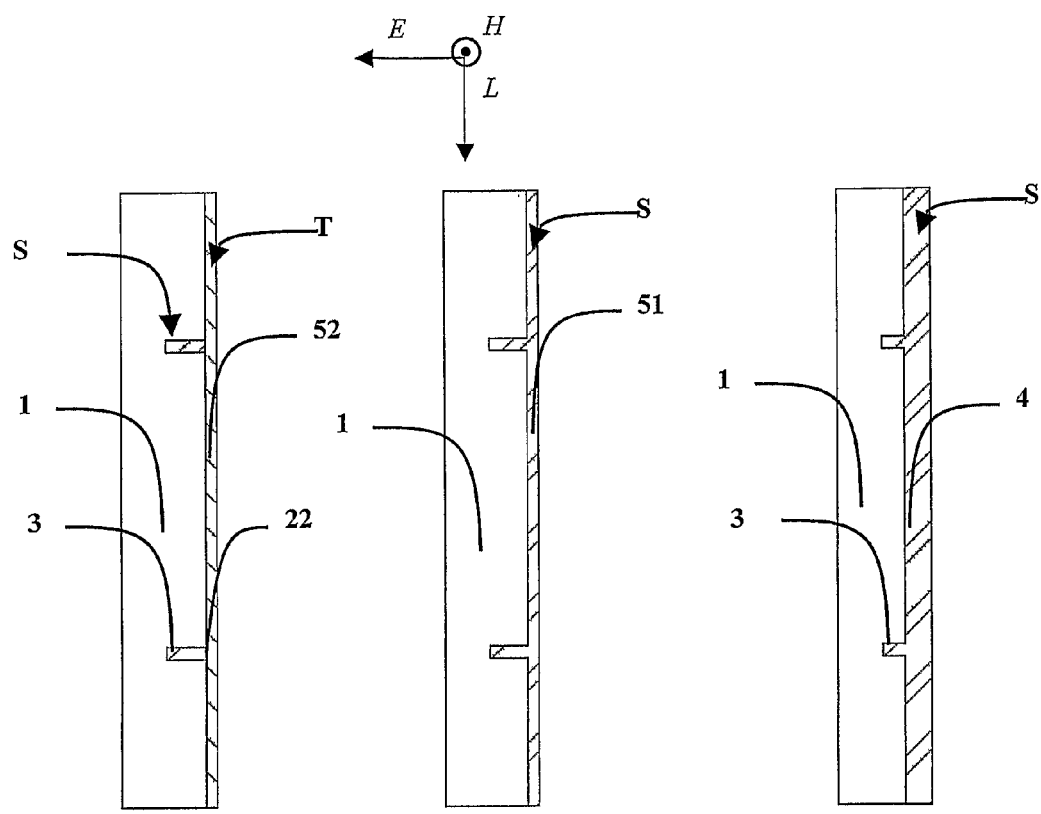
Figure 6a (F-F)   Figure 6b (E-E)   Figure 6c (D-D)

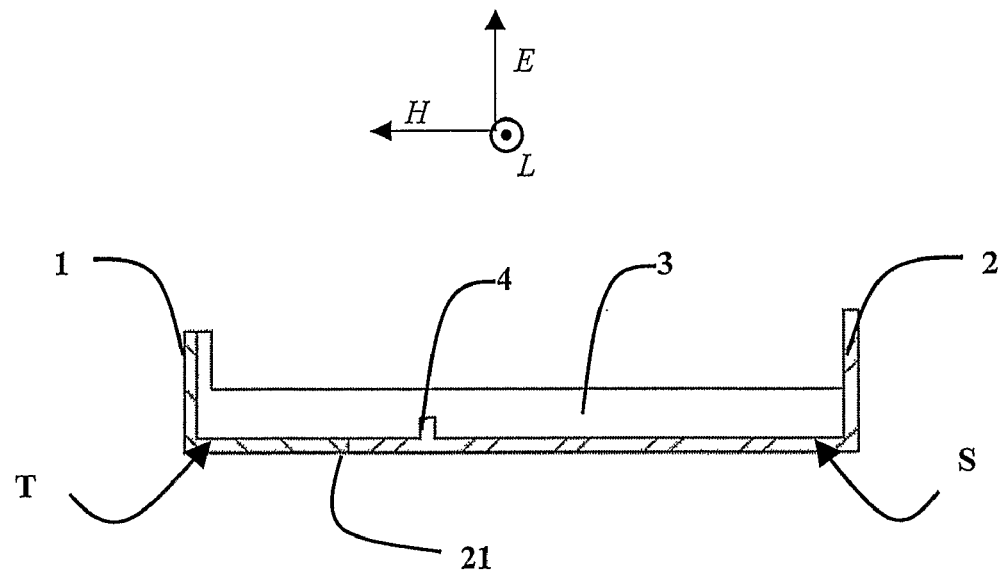
Figure 7a (A-A)
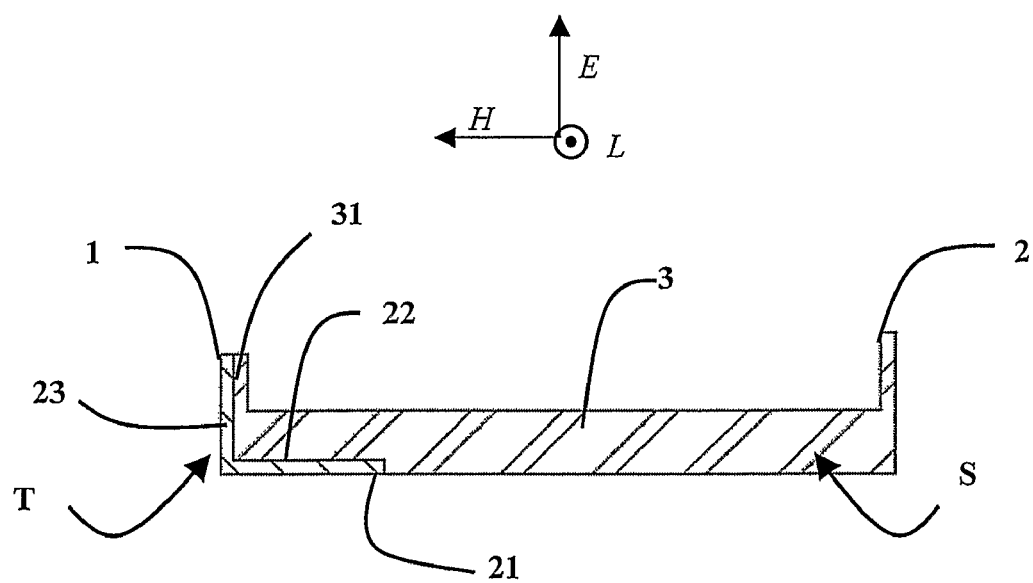
Figure 7b (B-B)

STRUCTURAL ELEMENT AND METHOD OF MANUFACTURE

The present application is based on International Application Number PCT/GB2006/004701 filed Dec. 15, 2006, and claims priority from French Application Number 0512808 filed Dec. 16, 2005, the disclosures of which are hereby incorporated by reference herein in their entirety.

FIELD OF THE INVENTION

The invention relates to a new method of manufacture for structure elements, typically based on aluminium, comprising at least two different elements, by the assembly of parts that have been shaped beforehand. The invention can be used for the manufacture of structure elements and in particular spars for aeronautical construction.

PRIOR ART

Parts having mechanical characteristics that are variable in space are very attractive for aeronautical construction. For some parts are confronted locally with different stresses which call for locally different technical solutions. Thus, the spars which connect the upper and lower wing surfaces are subjected mainly to compression stresses in their upper portion and mainly to tensile stresses in their lower portion. A spar is thus basically subjected to bending and shearing stresses. The parts most suited to compression stresses are typically parts having a high static mechanical strength, and the technical solutions adopted nowadays for the upper surface use aluminium alloys of type 7XXX, such as, for example, the alloy 7449 in the state T79. On the other hand, the parts most suited to tensile stresses are typically parts having a high damage tolerance in order to avoid the propagation of cracks and the technical solutions adopted nowadays for the lower surface use aluminium alloys of type 2XXX, such as, for example, the alloy 2024A in the state T351.

Aeroplane wings are composed of numerous elements which are generally assembled by riveting or bolting. A wing generally comprises a front spar and a rear spar and, by way of exception, a central spar. The length of the spar is measured in the longitudinal direction L (direction of the wing span of the aeroplane) extending from the root of the wing to the end thereof, its height is measured in the transverse direction H extending from the lower portion of the wing to the upper portion thereof and the thickness of the spar is measured in the direction E which extends from the leading edge of the wing to the trailing edge thereof. The thickness of the spar is small (generally less than 200 mm) while its height may be substantial (of the order of from 1 to 2 m for large-capacity transport aeroplanes in the vicinity of the root) and its length may be several meters. Viewed in cross-section, the front and rear spars are typically C-shaped while the central spar is typically I-shaped. The spar comprises a central portion called the web and ends which are typically perpendicular to the web and called flanges (or heels). The spar is reinforced at regular intervals along the length by stringers perpendicular to the longitudinal direction. These stringers (also called struts) may be obtained by assembly or preferably by machining in the mass, and they constitute a local excessive thickness. A crack-stopper, parallel to the longitudinal direction and located in the lower portion of the spar, may be present for the purpose of preventing the cracks created in the region under tension from propagating. Like the stringer, the crack-stopper may be obtained by assembly or preferably by machining.

Most spars are obtained by integral machining starting from a single metal block, which permits appreciable gains in productivity compared with mechanical assembly. However, an intermediate choice then has to be made in respect of the alloy and the metallurgical state in order to obtain, in the upper portion, sufficient static mechanical strength and, in the lower portion, an acceptable damage tolerance. A classic choice today is to use the alloy 7010 or the alloy 7040 in the state T7651.

It would, however, be particularly valuable to produce a bifunctional spar which is optimised in its upper portion for compression stresses and, in its lower portion, for tensile stresses. For such optimisation would enable the weight of each of the portions to be reduced and therefore a priori the weight of the spar to be reduced, which is a fundamental objective of the present-day aeronautical industry because it enables the cost of operating aircraft to be reduced. Furthermore, the lightening of aircraft involves an increase in the stresses applied to the lower surface and the upper surface. A non-optimised spar limits the stresses which can be applied to the upper surface and the lower surface.

Such a result can be obtained by assembling two parts which have different properties but which are essentially homogeneous inside each part. The assembly can be effected mechanically (for example, by bolting or riveting). However, that type of assembly takes a long time and is expensive because it necessitates the drilling of numerous openings and requires sophisticated equipment. In addition, the gain in weight obtained owing to the optimisation of the parts is partially lost owing to the necessity for the overlapping of the parts assembled mechanically. Another method would be to assemble the spar by welding. Of the known welding techniques, friction stir welding or FSW seems particularly suitable for the assembly of parts made of different alloys.

The application PCT WO 98/58759 (British Aerospace) describes a hybrid billet which is formed from an alloy 2000 and an alloy 7000 by friction stir welding and from which a spar is machined. That application also describes spars assembled by friction stir welding and mentions the value of optimising each portion of the spar as a function of the local stresses. The description of the spar is, however, very schematic in that application because it is limited to a view in C-shaped cross-section.

There are numerous technical difficulties associated with friction stir welding. First of all, and as for all welding techniques, friction stir welding leads to metallurgical changes in the welded region and in the regions close to the welded region which are affected by the heat, which changes may modify the mechanical properties of those regions. Numerous patents or patent applications, such as U.S. Pat. No. 6,168,067, US 2004/0056075, U.S. Pat. No. 6,902,444 describe heat treatments before or after the welding operation, which enables the harmful effects of welding on the mechanical properties of the joint to be limited. Subsequently, the thickness of the welded region is particularly limited in the case of friction stir welding. Thus, the maximum thickness that can be assembled in electron beam welding is of the order of 100 mm while it is of the order of 10 mm in friction stir welding.

On the other hand, friction stir welding has the advantage of enabling numerous geometries of welded joints to be obtained and of enabling different alloys to be welded together.

Patent application EP 1 547 720 A1 (Airbus UK) describes a method for the assembly by welding of two parts which are typically obtained from different alloys, in order to produce, after machining, a structural part for aeronautical applications, such as a spar. In order to avoid the thickness limitation of the friction stir welding technique, a groove is formed in the thickness of the opposing blocks, which enables them to be assembled and later machined. However, this groove causes a weakening of the stringers which comprise, depending on the machining, either a cavity or a notch, which may require the addition of a strengthening part by riveting. The production of this groove also constitutes extra expense.

Patent application EP 1 571 079 A1 (Airbus France) describes a spar having a recess in the central region. This spar can be produced by assembling two parts which are produced from different materials and which are connected by a junction splice bar.

The problem which the present invention seeks to solve is to propose a new method for manufacturing a bifunctional or multifunctional structural element comprising several assembled parts, which not only avoids a weakening of the stringers but which, on the contrary, permits the production of stringers having a mechanical strength greater than that obtained by the traditional methods.

SUBJECT-MATTER OF THE INVENTION

The invention relates to a method for manufacturing a structural element intended for aeronautical construction, typically a wing spar comprising a web extending substantially in a plane (L,H), L being the longitudinal direction and H being the transverse direction, the web having a length L1 and a height H1, the structural element being intended to be subjected to bending stress by a moment perpendicular to the said plane (L,H), and one or more adjacent stringer elements which are substantially perpendicular to the web and which extend in the transverse direction, comprising the following steps (i) at least a first and second metal block are made available, the limit of elasticity under compression of the first metal block being greater than that of the second metal block, (ii) the first metal block is machined in such a manner as to obtain a first machined monolithic part (S) which comprises a first web portion (51) having a length L1 and a height H4 less than H1 and at least one stringer element (3) which is substantially perpendicular and adjacent to the first web portion and whose height H'1, which is substantially equal to H1, is such that a stringer portion of height H'1-H4 extends beyond the first web portion 51, (iii) there is prepared, by shaping the second metal block, at least one second part (T) comprising at least a second web portion (52) of length L1 and height H5 extending in the direction of the height H up to a height H5, such that the sum H4+H5 is substantially equal to H1, (iv) the first monolithic part (S) and the second part (T) are assembled by placing the web portions (51) and (52) end-to-end over their entire common length L1, so that the stringer portion is adjacent to the second web portion.

The invention relates also to an integral structural element which can be obtained by the above method.

The invention relates thirdly to an integral structural element intended for aeronautical construction, typically a wing spar comprising a web extending substantially in a plane (L,H), L being the longitudinal direction extending from the root of the wing to the end thereof, and H being the transverse direction extending from the lower portion of the wing to its upper portion, the web having a length L1 and a height H1, and one or more stringer elements (3) which are adjacent and substantially perpendicular to the web and which extend in the transverse direction, characterised in that a) the structural element comprises at least a first monolithic part (S) and a second part (T), b) the limit of elasticity under compression of the metal block used to produce the element (S) is greater than that of the metal block used to produce the element (T), c) the first part (S) comprises a first substantially flat web portion (51) of length L1 and height H4 less than H1 and at least one stringer element (3) which is substantially perpendicular and adjacent to the first web portion and whose height H'1, which is substantially equal to H1, is such that a stringer portion of height H'1-H4 extends beyond the first web portion, d) the second part (T) comprising at least one second substantially flat web portion (52) of length L1 and height H5 such that the sum H4+H5 is substantially equal to H1, e) the first monolithic part (S) and the second part (T) are placed side-by-side in such a manner that the web portions (51) and (52) are end-to-end over their entire common length L1 and the stringer portion extending beyond the first web portion is adjacent to the second web portion.

DESCRIPTION OF THE FIGURES

FIGS. 6a, 6b, 6c, 7a and 7b are sectional views taken on the planes (F-F), (E-E), (D-D), (B-B) and (A-A), respectively.

DESCRIPTION OF THE INVENTION a) Definitions

Figure 1:
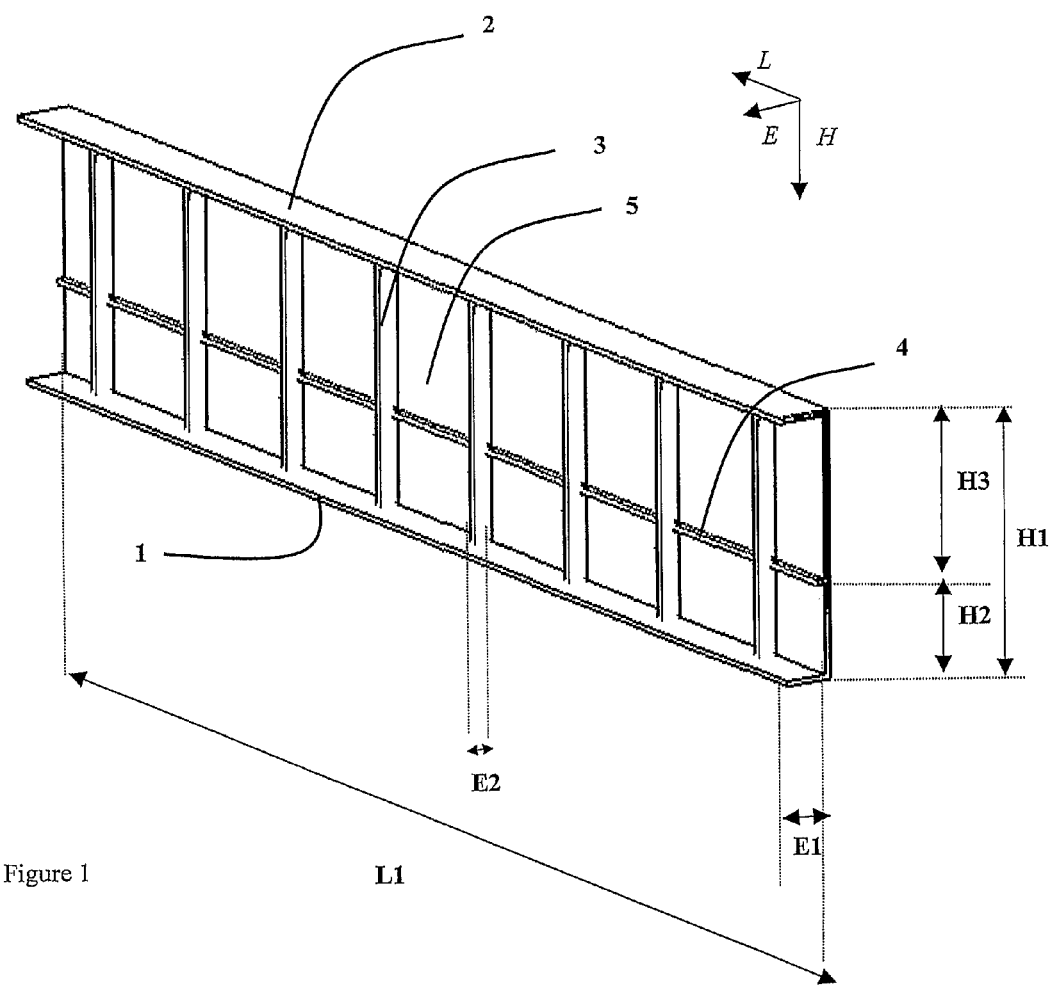
FIG. 1 shows diagrammatically a wing spar.

The nomenclature for the aluminium alloys follows the rules of The Aluminium Association, which are known to the person skilled in the art. The metallurgical states are defined in European standard EN 515. The chemical composition of standardised aluminium alloys is defined, for example, in the standard EN 573-3. Unless otherwise indicated, the "static mechanical properties", that is to say, the rupture strength $R_m$, the elastic limit $R_{p0.2}$, and the elongation at break A, are determined by tensile testing in accordance with the standard EN 10002-1, the site and the direction of taking the test specimens being defined in the standards EN 485-1 (rolled products) or EN 755-1 (extruded products). The elastic limit under compression is measured by a test in accordance with the standard ASTM E9. The Kapp stress intensity factor is determined in accordance with the standard ASTM E561. The toughness $K_{IC}$ is measured in accordance with the standard ASTM E 399. The fatigue crack propagation speed (so-called da/dN test) is measured in accordance with the standard ASTM E 647. "Damage tolerance" means, in particular, the toughness and the crack propagation resistance.

The term "machining" covers any process for removing material, such as turning, milling, drilling, boring, tapping, electro-erosion, grinding, polishing.

Here, a "structure element" or "structural element" of a mechanical construction is a mechanical part whose failure could jeopardise the safety of the construction, its users, its utilisers, or others.

For an aeroplane, those structure elements include, in particular, the elements which make up the fuselage (such as the fuselage skin), the stringers, the bulkheads, the circumferential frames, the wings (such as the wing skin), the stringers or stiffeners, the ribs and spars and the empennage made up, in particular, of horizontal and vertical stabilisers, and also the floor beams, the seat tracks and the doors.

The term "spar" here denotes the longitudinal elements, that is to say, in the direction of the wing span, of the wing and of the tail unit elements.

"Solid part" or "solid element" here means a part or an element that does not comprise an opening or a recess.

The term "monolithic structure element" or "monolithic part" refers here to a structure element or a part which has been obtained, generally by machining, from a single block of rolled, extruded, forged or moulded semi-finished product, without assembly, such as riveting, welding, adhesive bonding, with another part.

In the context of this description, an "integral structural element" denotes a structural element whose structure has been designed to achieve a continuity of material over the greatest possible portion in order to reduce the number of mechanical assembly points. An "integral structural element" can be produced either by depth machining, or by using elements that are shaped, for example, by extrusion, forging or moulding, or by welding structural elements. A "mechanically assembled structure" means a structure in which the metal sheets, which are thin or thick as a function of the intended purpose of the structure element (for example, a fuselage element or a wing element) are secured, normally by riveting, to stringers and/or frames (which can be manufactured by machining from extruded or rolled products).

The term "bifunctional or multifunctional structure element" refers here principally to the functions conferred by the metallurgical properties of the product and not by its geometrical shape.

b) Detailed Description of the Invention

According to the invention, the problem is solved by the method for manufacturing a structural element which is intended for aeronautical construction, typically a wing spar comprising a web extending substantially in a plane (L,H), L being the longitudinal direction and H being the transverse direction, the web having a length L1 and a height H1, the structural element being intended to be subjected to bending stress by a moment perpendicular to the said plane (L,H), and one or more adjacent stringer elements which are substantially perpendicular to the web and which extend in the transverse direction, comprising the following steps (i) at least a first and a second metal block are made available, the limit of elasticity under compression of the first metal block being greater than that of the second metal block, (ii) the first metal block is machined in such a manner as to obtain a first machined monolithic part (S) which comprises a first web portion (51) having a length L1 and a height H4 less than H1 and at least one stringer element (3) which is substantially perpendicular and adjacent to the first web portion and whose height H'1, which is substantially equal to H1, is such that a stringer portion of height H'1-H4 extends beyond the first web portion (51), (iii) there is prepared, by shaping the second metal block, at least one second part (T) comprising at least a second web portion (52) of length L1 and height H5 extending in the direction of the height H up to a height H5, such that the sum H4+H5 is substantially equal to H1, (iv) the first monolithic part (S) and the second part (T) are assembled by placing the web portions (51) and (52) end-to-end over their entire common length L1, so that the stringer portion is adjacent to the second web portion.

The metal blocks are advantageously composed of aluminium alloy and they preferably originate from thick pieces of sheet-metal, that is to say, sheet-metal having a thickness greater than or equal to 12 mm, which are obtained from structural-hardening aluminium alloys. In an advantageous embodiment of the invention, the first metal block is obtained from an aluminium alloy from the series 7XXX, and more preferably an aluminium alloy included in the group constituted by 7040, 7140, 7055, 7085, 7149, 7249, 7349, 7449. In another advantageous embodiment of the invention, the first metal block is obtained from an aluminium alloy containing lithium, and more preferably an aluminium alloy included in the group constituted by 2050, 2094, 2098, 2195, 2196 and 2199. In another advantageous embodiment of the invention, at least one monolithic part (T) is obtained from an aluminium alloy of series 2XXX and more preferably an aluminium alloy included in the group constituted by 2022, 2024, 2024A, 2027, 2056, 2139 or an aluminium alloy containing lithium included in the group constituted by 2050, 2094, 2098, 2195, 2196 and 2199.

The shaping processes that may be used in step (iii) include rolling, extrusion, die-stamping, forging and machining. Preferably, step (iii) is carried out by machining.

The assembly effected in step (iv) can be carried out by any appropriate method, especially bolting, riveting, adhesive bonding and welding. The welding methods enable an integral structural element to be obtained, which is advantageous for the present invention, and they comprise oxyacetylene welding with filler metal, arc welding with non-consumable electrodes (TIG), arc welding with consumable wire electrodes or semi-automatic welding (MIG-MAG), laser welding, plasma welding, electron beam welding, friction stir welding (FSW). In an advantageous embodiment of the invention, the assembly technique used is friction stir welding.

In the case of assembly by welding, a heat treatment can be carried out, before and/or after machining and/or after assembly on the part(s) (S) and/or on the part(s) (T), in order to obtain the final metallurgical state most appropriate for the parts and for the welded region. A mechanical treatment of the welds, for example by shot-peening, can be carried out.

A final step in which the structural element resulting from step (iv) is machined in order to obtain a final integral structural element can optionally be carried out. This step enables any defects created by the welding operation to be corrected and the exact dimensions of the integral structural element for its mounting in the structure of the aircraft to be achieved.

FIG. 1 shows an example of a perspective view of a spar portion in the shape of a C. The length L1 of the spar is measured in the longitudinal direction L extending from the root of the wing to the end thereof, its height H1 is measured in the transverse direction H extending from the lower portion of the wing to its upper portion and the thickness E1 of the spar is measured in the direction E which extends from the leading edge of the wing to its trailing edge. This spar portion comprises a lower flange (1), an upper flange (2) and a web (5). The lower and upper flanges are typically flat and extend in a plane which is typically parallel to the plane (E,L) in the direction E up to a thickness E1 and in the direction L up to the length L1. The web (5) is typically flat and extends substantially in the plane (L,H) in the direction H up to the height H1 and in the direction L up to the length L1. Spaced at regular intervals, stringers (3) reinforce the web (5). The stringers (3) are elements substantially perpendicular to the web (5) which extend in the transverse direction H up to a height close to H'1 close to H1 and in the direction E up to a thickness E2 which is generally less than or equal to E1. The heights H1 and H'1 differ basically according to the thickness of the flanges. The shapes of the various stringers may vary within the same part. Some stringers may be intended to be secured to the ribs and may have a shape appropriate to that use.

For a structural element produced by machining, there is continuity of material between the stringers (3) and the web (5).

A crack-stopper (4) may optionally be added at a distance H2 from the lower flange, which is generally shorter than the distance H3 between the crack-stopper and the upper flange. The purpose of the optional crack-stopper (4) is to prevent cracks which have appeared in the lower portion, which is the most subject to tensile stresses, from propagating in the upper portion. For a structural element produced by machining, there is continuity of material between the crack-stopper (4) and the web (5).

Figure 2:
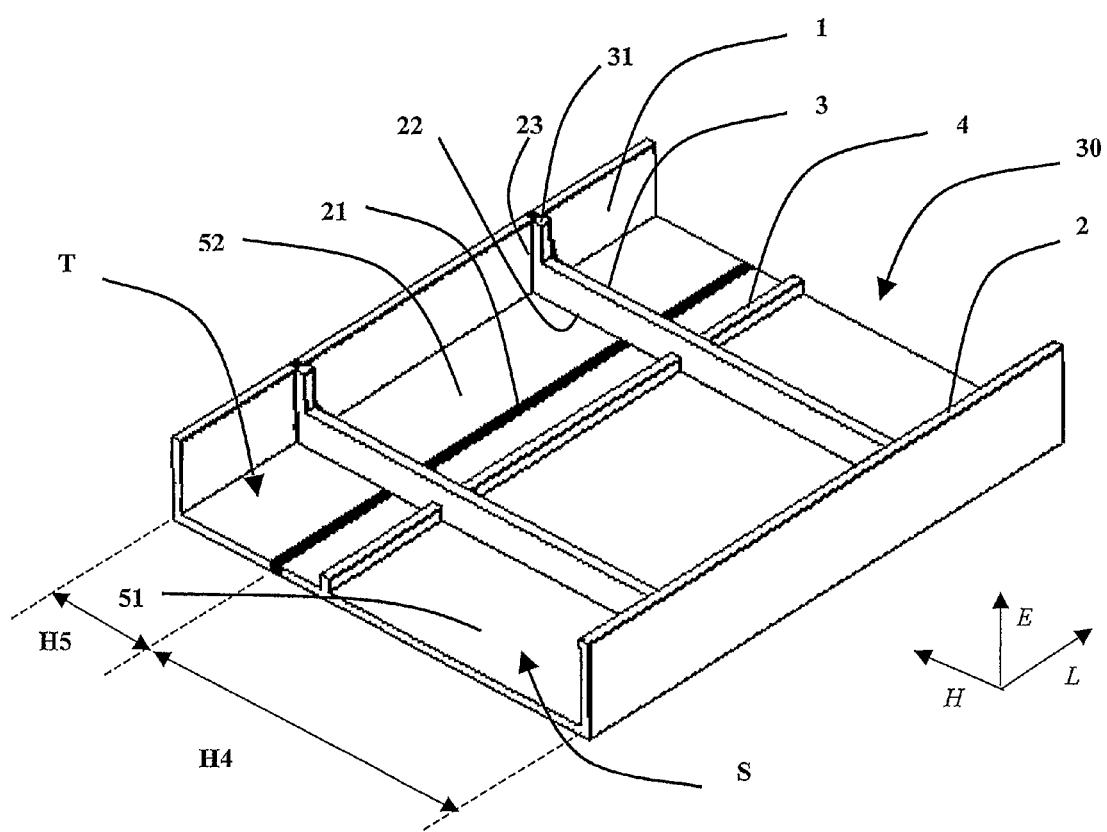
FIG. 2 shows an example of a structural element according to the invention.
Figure 3:
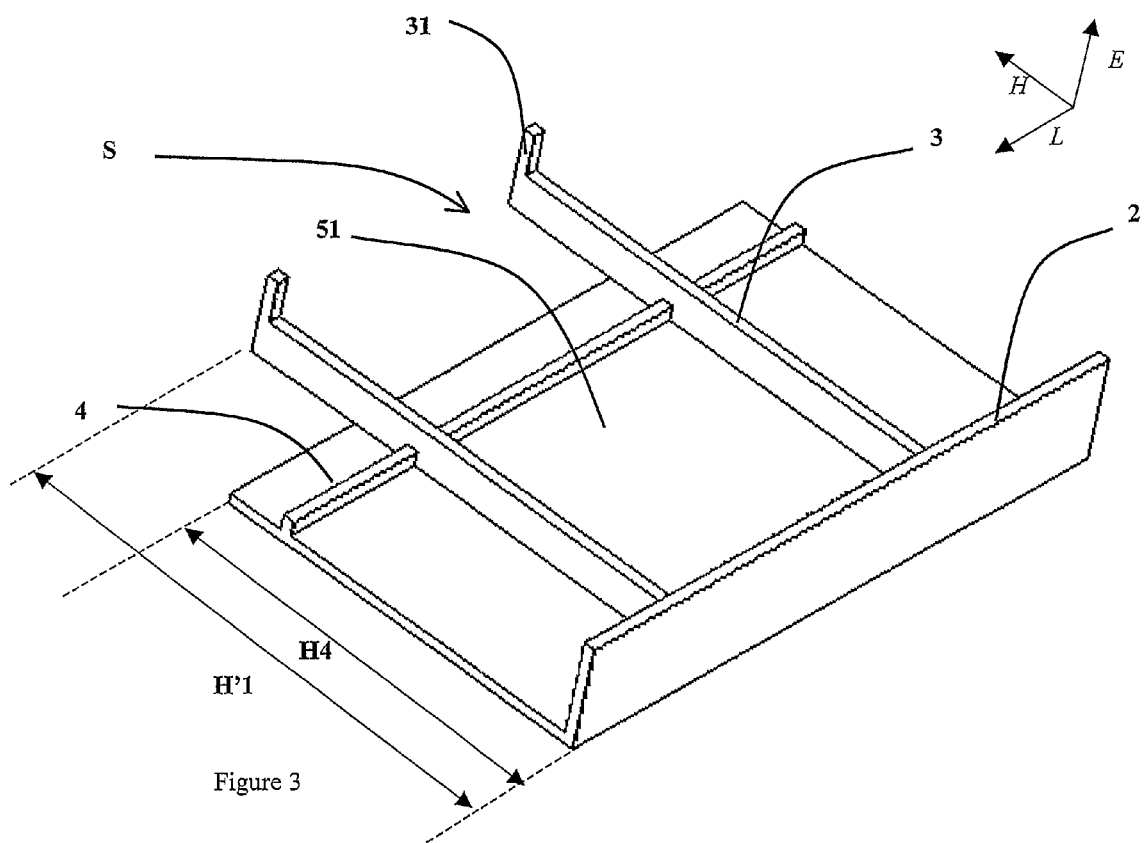
FIG. 3 shows the part (S) according to the invention machined in the part having the highest limit of elasticity under compression.

FIG. 2 shows a perspective view of a spar portion (30) comprising two stringers according to the invention. This portion is not limiting and can be lengthened in such a manner as to include the number n of stringers necessary for the manufacture of the complete spar. In this example, the spar according to the invention comprises two parts, a first monolithic part (S) and a second part (T), which have been assembled. The web (5) is constituted by two web portions (51) and (52) originating from the parts (S) and (T), respectively, and positioned end-to-end over their entire common length L1, thus co-operating to form the web (5). Preferably, the web of this part according to the invention is solid. The parts (S) and (T) are described individually by FIGS. 3 and 4. According to the invention, the part (S) is produced from a block having a limit of elasticity under compression higher than that of the block used to produce the part (T). Advantageously, the part (T) can be produced from a block having a Kapp stress intensity factor higher than that of the block used to produce the part (S). In an advantageous embodiment of the invention, the part (S) is composed of alloy α while the part (T) is composed of alloy τ, the alloy α being favourable to obtaining high static mechanical properties and the alloy τ being favourable to obtaining a high damage tolerance. The stringers (3) form an integral part of the monolithic part (S) so as to obtain the mechanical properties most favourable for the assembly. FIG. 3 thus shows that the stringers (3) which are substantially perpendicular and adjacent to the web portion (51) extend beyond the web portion (51) in the direction H. Typically, the stringer element (3) extends in the direction of the height H up to a height H'1 close to H1. The web portion (51) extends in the direction H up to a height H4 from the upper flange (2) in such a manner that a stringer portion, of height H'1-H4 extends beyond the web portion (51). Preferably, the distance H4 is greater than H1/2 in order to have a web which is constituted mainly by the element having the highest compression strength. In an advantageous embodiment of the invention, the stringers (3) are constituted entirely by alloy α. At the end of the stringers (3), a lengthening piece (31) extending in the direction E up to a height close to E1 may optionally facilitate securing to the part (T). It is particularly advantageous to have a stringer with a high limit of elasticity under compression because the stresses applied to the stringers are mainly compression stresses associated with the forces tending to move the upper surface and the lower surface towards each other and with the diagonal stresses.

In the optional case in which the structural element according to the invention contains a crack-stopper (4), the latter is preferably machined in the part (S).

Figure 4:
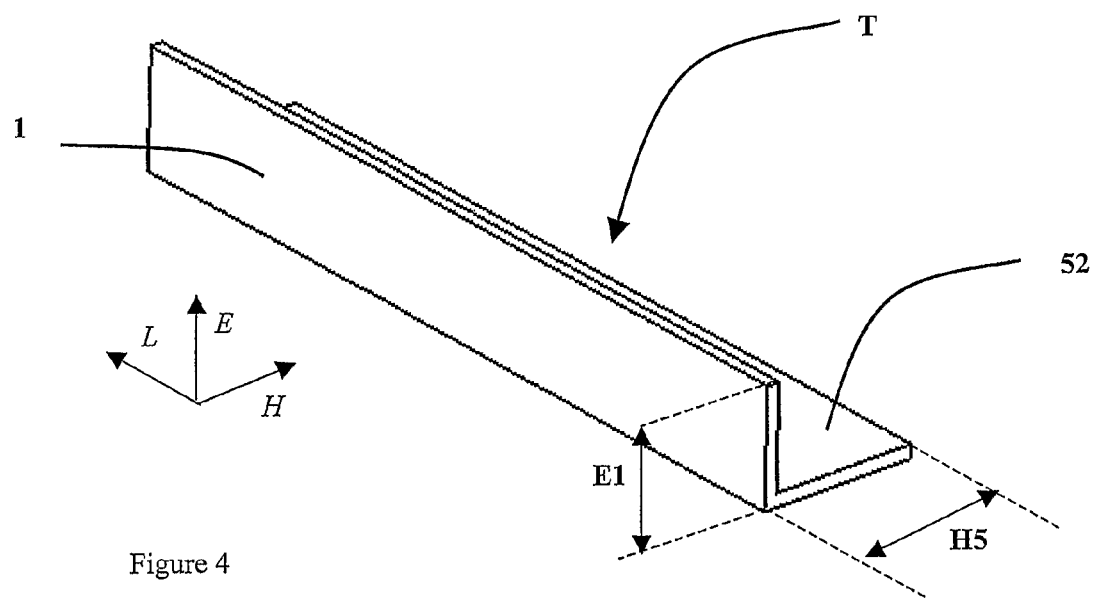
FIG. 4 shows the part (T) according to the invention which is to be assembled by welding with the part (S).

FIG. 4 shows the part (T) whose web portion (52) is of length L1 and of height H5 such that the sum H4+H5 is substantially equal to H1.

There are three distinct regions of contact between the parts (T) and (S): the region (21) where the web portions (51) of the part (S) and (52) of the part (T) are in end-to end contact in the direction L, the region (22) where the stringer portion (3) extending beyond the web portion (51) is in contact with the web portion (52) of the part (T) in the direction H and the region (23) where the end of the stringer of the part (S) is in contact with the lower flange (1) of the part (T) in the direction E. A weld bead, which is preferably obtained by friction stir welding, has been produced in the regions (21), (22) and (23). The welding of the region (21) corresponds to a butt-weld in the direction L and to a T-shaped weld at the junction with each stringer, the welds of regions (22) and (23) correspond to T-shaped welds in the directions H and E, respectively.

Figure 5:
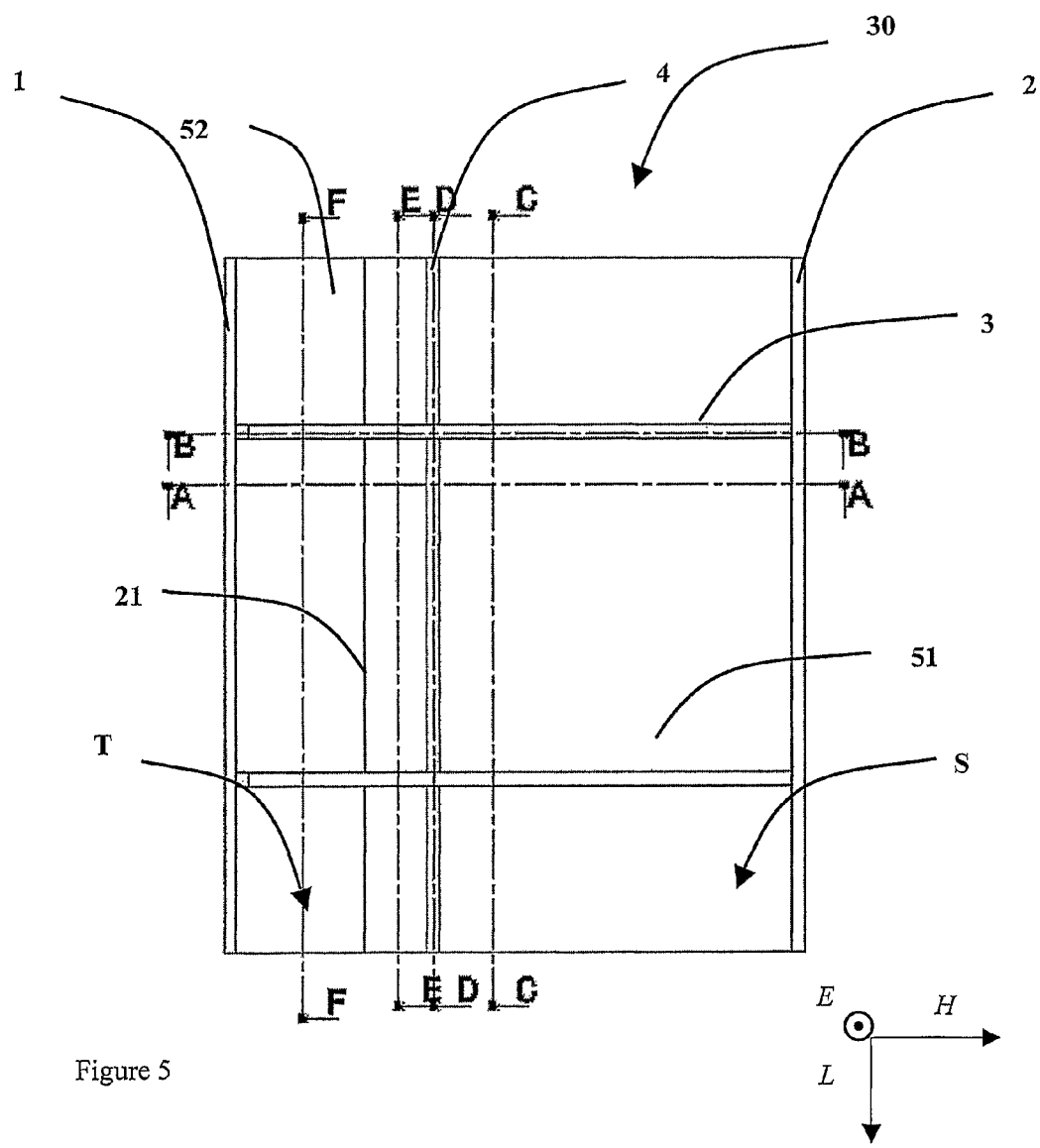
FIG. 5 is a view in the plane (H,L) of the structural element of FIG. 2.

FIG. 5 is a view in the plane (H,L) of the spar portion (30) of FIG. 2. The positions of the sections shown in detail in FIGS. 6 and 7 are represented in FIG. 5.

FIG. 6a is a section in the plane (E,L) at position (F-F) of a spar according to an example of the invention. It is a view in the direction of the lower flange (1), the contour of which is represented. In this plane, the stringer (3) originates from the part (S) while the web portion (52) originates from the part (T). A weld produced in the region (22) in the direction H contributes to the assembly of the parts (S) and (T). FIG. 6b is a section in the plane (E,L) at the position (E-E) of a spar according to an example of the invention. It is a view in the direction of the lower flange (1), the contour of which is represented. At this position, the web portion (51) and the stringer (3) both originate from the part (S). FIG. 6c is a section in the plane (E,L) at position (D-D) of the crack-stopper (4) of a spar according to an example of the invention. It is a view in the direction of the lower flange (1), the contour of which is represented. The crack-stopper (4) and the stringer (3) both originate from the part (S). FIG. 7a is a section in the plane (E,H) at the position (A-A) of a spar according to an example of the invention. It is a view in the direction of a stringer (3), the contour of which is represented. The part (S) is in end-to-end contact with the part (T) in the region (21). FIG. 7b is a section in the plane (E,H) at the position (B-B) of a stringer (3), of a spar according to an example of the invention. This section shows that the stringer (3) originates from the part (S) and that it is welded to the part (T) in three different regions: (21), (22) and (23), in the directions L, H and E.

In the case of friction stir welding, an additional technical advantage of the invention is obtained owing to the weld (21). For the welds obtained by friction stir welding act as crack-stoppers, in the manner of the crack-stopper (4). This effect of friction stir welding is described, for example, by R. John (R. John, K. V. Jata, K. Sadananda, International Journal of Fatigue 25 (2003) 939-948). The weld (21) therefore prevents cracks created in the part (T) from propagating in the part (S). The weld bead obtained by friction stir welding (21) may enable the use of a crack-stopper to be dispensed with. The cracks generally appear in the lower flange and propagate in the web. The weld bead obtained by friction stirring (21) is positioned sufficiently far from the lower flange for the stresses not to be too great but sufficiently close rapidly to stop the cracks; advantageously the position chosen is close to the neutral line of the wing. Preferably, the distance H4 is between (⅔)*H1 and (⅚)*H1.

Figure 8:
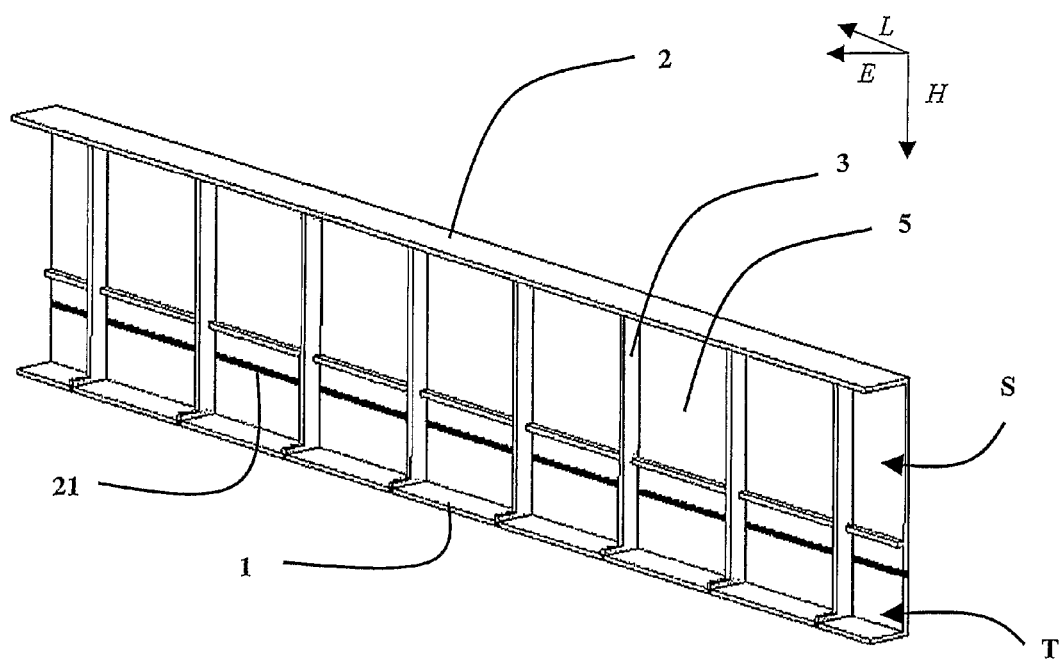
FIGS. 8 and 9 are views of the two faces of an example of a spar according to the invention.
Figure 9:
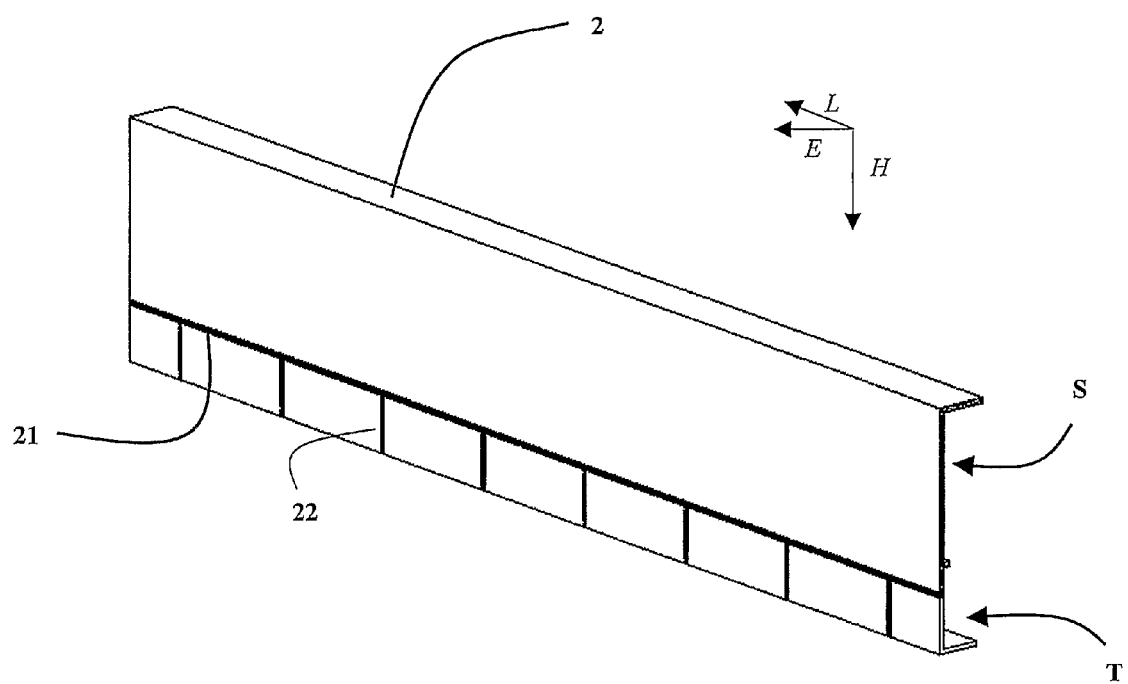

FIGS. 8 and 9 show on the two faces an example of a part according to the invention comprising eight stringers (3). The welds (22) for each stringer are shown in FIG. 9.

In an advantageous embodiment of the invention, the structural element comprises only two monolithic parts, a part (S) and a part (T), which are assembled by welding.

Figure 10:
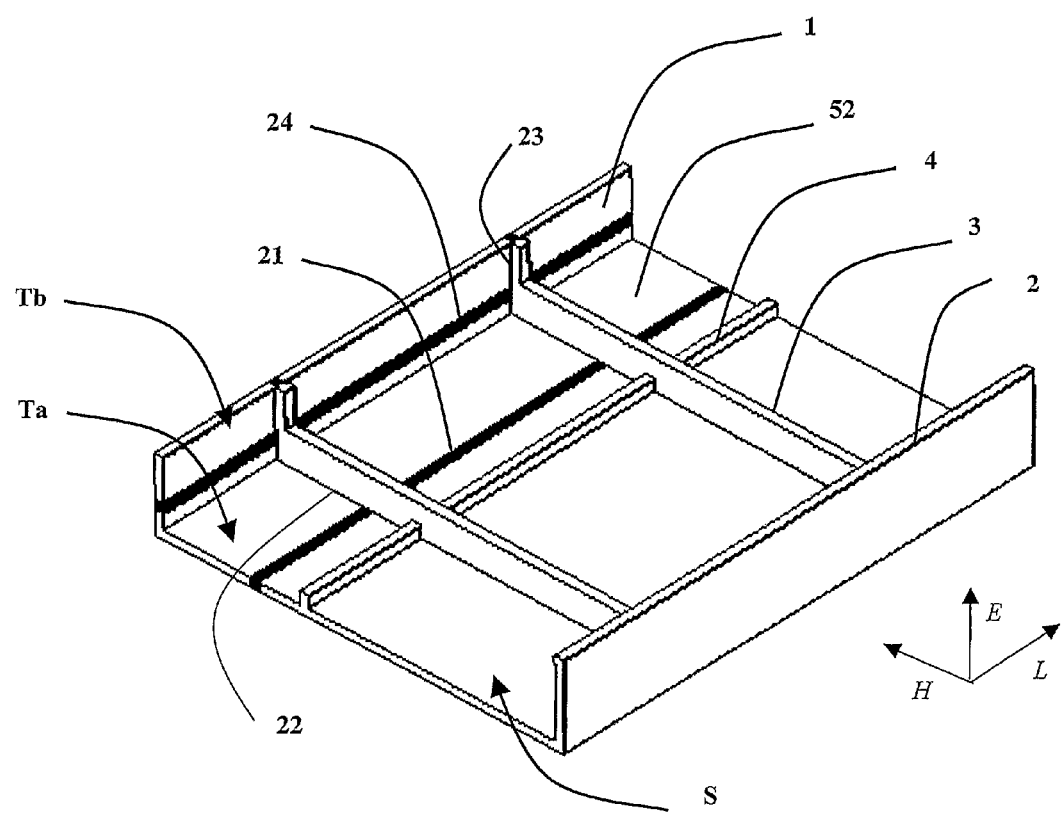
FIG. 10 is an example of another embodiment of the structural element according to the invention.

In another embodiment of the invention, the part (T) is formed by two parts (Ta) and (Tb), which are advantageously assembled by welding. This embodiment is economical because it enables the part (T) to be produced using a minimum of material in unwrought form, for example composed of alloy τ. FIG. 10 shows an example of a part produced in accordance with this method. The part (Ta) comprises the web portion (52), and the parts (Ta) and (Tb) co-operate to form the lower flange (1). An additional weld in the longitudinal direction L (24), parallel with the weld (21) and perpendicular to the welds (22) and (23), is produced in order to assemble the parts (Ta) and (Tb). In an advantageous embodiment, the part (Ta) is assembled with the part (S) before the assembly of (Tb) with (Ta) and (S) and the welds are therefore produced in the order (21), (22), (24) and (23).

According to an example of the invention, a plate composed of alloy α is cast in accordance with the methods known to the person skilled in the art. Preferably, the alloy α is a structural-hardening alloy enabling enhanced static mechanical properties ($R_{02}$, $R_m$) to be obtained. In an advantageous embodiment of the invention, this alloy α is an aluminium alloy of the series 7XXX, and more preferably an aluminium alloy included in the group constituted by 7040, 7055, 7140, 7085, 7149, 7249, 7349, 7449. In another advantageous embodiment of the invention, this alloy α is an aluminium alloy containing lithium, and more preferably an aluminium alloy included in the group constituted by 2094, 2195, 2196 and 2199. The plate obtained is homogenised, re-heated, hot-rolled, placed in a solution, quenched and optionally subjected to tensile stress in accordance with conditions known to the person skilled in the art in order to obtain a thick sheet having the desired dimensions. The thick sheet obtained is then machined in order to obtain a part (S). In addition, a plate of aluminium alloy τ is cast in accordance with the methods known to the person skilled in the art. Preferably, the aluminium alloy τ is an aluminium alloy having enhanced damage tolerance properties, such as toughness or fatigue crack propagation resistance. In an advantageous embodiment of the invention, the aluminium alloy τ is an aluminium alloy of the series 2XXX and more preferably an aluminium alloy included in the group constituted by 2024, 2024A, 2056, 2098. The plate of aluminium alloy τ is homogenised, converted at high temperature and optionally at low temperature in order to obtain a thick sheet having the desired dimensions. The thick sheet of alloy τ is then machined in order to obtain the part (T). In another example according to the invention, the part (T) is obtained by extrusion from a billet of alloy τ.

The parts (S) and (T) are then positioned relative to each other in such a manner that the web portions (51) and (52) co-operate to form the web (5) and are held in place by an appropriate device. The welds (21): butt weld between the web portions (51) and (52) of the parts (S) and (T) in the direction L, (22): T-shaped weld between the stringer (3) and the web portion of the part (T) (51), and (23): T-shaped weld between the stringer (3) and the flange (1) of the part (T), are then produced by friction stir welding. In general, there is only one weld of the type (21) whose length is the length of the final part, while there is one weld of type (22) and one weld of type (23) per stringer. In an advantageous embodiment of the invention, friction stir welding is used to produce these welds. The order in which the welds (21), (22) and (23) are produced is not critical but the inventors have observed that it is advantageous to produce the welds in the order (21), (22) and (23).

After assembly, a final machining of the assembled part (30) is carried out in order to obtain the exact dimensions desired.

Preferably, the structural element obtained by the method according to the invention is a wing spar.

In another advantageous embodiment, the structural element obtained by the method according to the invention is a fuselage component.

The invention claimed is:

1. A method for manufacturing a structural element intended for aeronautical construction, comprising a web extending substantially in a plane L,H, L being the longitudinal direction and H being the transverse direction, the web having a length L1 and a height H1, the structural element being intended to be subjected to bending stress by a moment perpendicular to the said plane L,H, and one or more adjacent stringer elements which are substantially perpendicular to the web and which extend in the transverse direction, comprising the following steps
   (i) at least a first and second metal block are made available, the limit of elasticity under compression of the first metal block being greater than that of the second metal block,
   (ii) the first metal block is machined in such a manner as to obtain a first machined monolithic part S which comprises a first web portion having a length L1 and a height H4 less than H1 and at least one stringer element which is substantially perpendicular and adjacent to the first web portion and whose height H'1, which is substantially equal to H1, is such that a stringer portion of height H'1-H4 extends beyond the first web portion,
   (iii) there is prepared, by shaping the second metal block, at least one second part T comprising at least a second web portion of length L1 and height H5 extending in the direction of the height H up to a height H5, such that the sum H4+H5 is substantially equal to H1,
   (iv) the first monolithic part S and the second part T are assembled by placing the web portions end-to-end over their entire common length L1, so that the stringer portion is adjacent to the second web portion.

2. The method of manufacture according to claim 1, wherein the method of assembly used in step iv is welding.

3. The method of manufacture according to claim 2, wherein the welding method used is friction stir welding.

4. The method of manufacture according to claim 1, wherein the alloys used to produce the first and the second parts are different.

5. The method of manufacture according to claim 1, wherein the metal blocks are composed of aluminium alloy.

6. The method of manufacture according to claim 1, wherein the first metal block is obtained from an aluminium alloy of the series 7XXX.

7. The method of manufacture according to claim 6, wherein the first metal block is obtained from an aluminium alloy included in the group constituted by 7040, 7140, 7055, 7085, 7149, 7249, 7349, 7449.

8. The method of manufacture according to claim 1, wherein the first metal block is obtained from an aluminium alloy included in the group constituted by 2050, 2094, 2098, 2195, 2196 and 2199.

9. The method of manufacture according to claim 1, wherein at least one monolithic part T is obtained from an aluminium alloy of series 2XXX.

10. The method of manufacture according to claim 9, wherein at least one of said first or second parts is obtained from an aluminium alloy included in the group constituted by 2022, 2024, 2024A, 2027, 2056, 2139.

11. The method of manufacture according to claim 9, wherein at least one of said first or second parts is obtained from an aluminium alloy included in the group constituted by 2050, 2094, 2098, 2195, 2196 and 2199.

12. The method of manufacture according to claim 1, wherein all of the stringer elements are integrally produced in the metal block having the highest limit of elasticity under compression.

13. The method of manufacture according to claim 1, wherein the structural element is obtained by welding said first and second parts.

14. The method of manufacture according to claim 1, wherein the structural element is a wing spar.

15. The method of manufacture according to claim 1, wherein the structural element is a fuselage component.

16. The method of manufacture according to claim 1, wherein a heat treatment is carried out before and after machining and after assembly on the first part and on the second part.

17. The method according to any claim 1, comprising a final step in which the integral structural element resulting from step iv is machined in order to obtain a final integral structural element.

18. An integral structural element obtained by a method of manufacturing according to claim 1.

19. The method of manufacture according to claim 1, wherein a heat treatment is carried out before and after machining or after assembly on the first part and on the second part.

20. The method of manufacture according to claim 1, wherein a heat treatment is carried out before or after machining and after assembly on the first part or on the second part.

21. The method of manufacture according to claim 1, wherein a heat treatment is carried out before or after machining or after assembly on the first part and on the second part.

22. The method of manufacture according to claim 1, wherein a heat treatment is carried out before or after machining and after assembly on the first part or on the second part.

23. An integral structural element intended for aeronautical construction, typically a wing spar comprising a web extending substantially in a plane L,H, L being the longitudinal direction extending from the root of the wing to the end thereof, and H being the transverse direction extending from the lower portion of the wing to its upper portion, the web having a length L1 and a height H1, and one or more stringer elements which are adjacent and substantially perpendicular to the web and which extend in the transverse direction, characterised in that the structural element comprises at least a first monolithic part S and a second part T, the limit of elasticity under compression of the metal block used to produce the first part S is greater than that of the metal block used to produce the second part T, the first part S comprises a first substantially flat web portion of length L1 and height H4 less than H1 and at least one stringer element which is substantially perpendicular and adjacent to the first web portion and whose height H'1, which is substantially equal to H1, is such that a stringer portion of height H'1-H4 extends beyond the first web portion, the second part T comprising at least one second substantially flat web portion of length L1 and height H5 such that the sum H4+H5 is substantially equal to H1, the first part S and the second part T are placed side-by-side in such a manner that the web portions are end-to-end over their entire common length L1 and the stringer portion extending beyond the first web portion is adjacent to the second web portion.

24. The integral structural element according to claim 23, wherein the first and the second parts are assembled by welding.

25. The integral structural element according to claim 24, comprising a lower flange and an upper flange which are substantially flat and which extend in a plane which is substantially parallel with the plane E,L in the direction E up to the thickness E1 and in the direction L up to the length L1.

26. The integral structural element according to claim 23, comprising a lower flange and an upper flange which are substantially flat and which extend in a plane which is substantially parallel with the plane E,L in the direction E up to the thickness E1 and in the direction L up to the length L1.

27. The integral structural element according to claim 26, wherein the at least one stringer comprises at its end a lengthened portion which extends in the direction E up to a thickness substantially equal to E1.

28. The integral structural element according to claim 27, wherein the first and the second parts are assembled by at least three types of weld: at least one butt weld which is parallel with the direction L and which enables the web portions and to be assembled, at least one T-shaped weld which is parallel with the direction H and which enables the elements and to be assembled, and at least one T-shaped weld which enables the elements to be assembled.

29. The integral structural element according to claim 26, wherein the second part comprises two elements that form the lower flange.

30. The integral structural element according to claim 23, wherein the first monolithic part S comprises a crack-stopper in a plane E,L.

* * * * *